United States Patent [19]

Antikainen et al.

[11] Patent Number: 4,693,360
[45] Date of Patent: Sep. 15, 1987

[54] CONTINUOUS OPERATION BULK GOODS UNLOADER

[75] Inventors: Jorma Antikainen; Yrjö Olsoni; Pentti Välimäki, all of Hyvinkää, Finland

[73] Assignee: Kone Oy, Helsinki, Finland

[21] Appl. No.: 294,143

[22] Filed: Aug. 19, 1981

[30] Foreign Application Priority Data

Aug. 21, 1981 [FI] Finland .................................. 802635

[51] Int. Cl.⁴ ........................ B65G 41/00; B65G 47/16
[52] U.S. Cl. ................................ 198/509; 198/861.3; 414/139; 414/144
[58] Field of Search ............ 198/307, 509, 864, 861.2, 198/861.3; 414/139, 140, 144, 145

[56] References Cited

U.S. PATENT DOCUMENTS

| 3,557,937 | 1/1971 | Kahre .............................. | 198/864 X |
| 4,230,220 | 10/1980 | Iino ..................................... | 198/509 |
| 4,236,857 | 12/1980 | Willi ................................. | 198/509 X |
| 4,362,237 | 12/1982 | Olsztynski et al. ................. | 198/509 |

Primary Examiner—Jeffrey V. Nase

[57] ABSTRACT

A continuously operating bulk goods unloader which has by a vertical jib supporter (9) maintaining its direction been affixed to a supporting structure carrying the unloader and within the tubular vertical jib (1) of which runs an endless compartmented belt (5), onto which a detacher head (4) discharges bulk goods. The vertical jib (1) has been subdivided into a lower part (3) and an upper part (2), these parts being interconnected by a turnable joint (6), and the lower part (3) is tiltable with reference to the upper part (2) at the turnable joint, with the aid of pressure cylinder (8).

2 Claims, 3 Drawing Figures

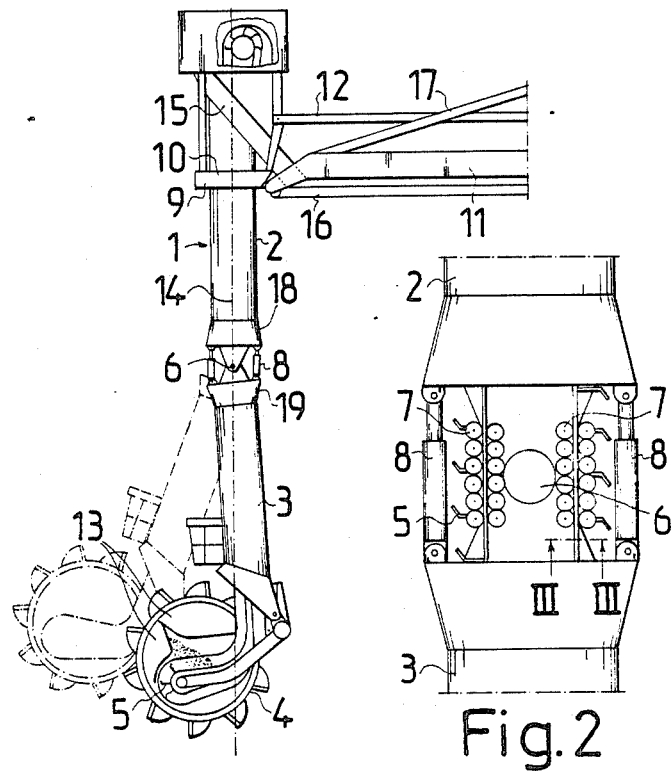
Fig.1
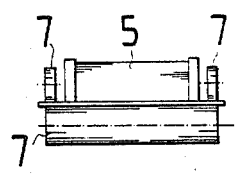
Fig.2
Fig.3

CONTINUOUS OPERATION BULK GOODS UNLOADER

The present invention concerns a continuously operating means for unloading bulk goods and which has by a vertical jib support maintaining its direction been affixed to a supporting structure carrying the means and within the tubular vertical jib of which runs an endless compartmented belt, onto which a detacher head discharges bulk goods.

A drawback of all means of this kind known in the art is that they are usually big, complex and expensive pieces of machinery. As a result, they are difficult to move and control. Moreover, owing to great size they are not able to enter the holds of all smaller ships. There are also continuously operating unloaders with which it is possible to operate in vessels with small cargo hatches, but it is not at present possible in apparatus of this type to make the detacher head reach under the hold aperture's edges, instead of which unloading is only feasible from an area having the same breadth as the hatch. The detriment is then a poor degree of emptying—only about 70 to 80% of the total contents of the hold. There are furthermore pieces of equipment having a small detacher head and in which the whole vertical jib is tilted. Then, however, the material tends to build a vault when being unloaded, or it forms a vertical wall, whereby unloading the material is rendered difficult and the entire crane needs to be moved during the unloading operation.

The object of the present invention is to eliminate the drawbacks mentioned and to provide a simple and flexible solution to the problem constituted by the unloading of cargo from bulk vessels. This implies a solution by which the requisite reaches are achieved and with which it is possible to operate even in the space confined by a small cargo hold hatch. The unloading means of the invention is characterized in that the vertical jib has been subdivided into a lower part and an upper part, these parts being joined together by a turnable joint, and that the lower part is tiltable with reference to the upper part at the turnable joint, with the aid of turning means. The advantages offered by the means of the invention include the advantage that the distance of the detacher head from the axis of rotation can be changed, whereby a good reach in under the hatch margins is achieved and there is space enough for operation even in a small cargo hatch.

The unloader means of an advantageous embodiment of the invention is characterized in that the turning means are pressure cylinders which have been disposed substantially parallelling the vertical jib, between the upper and lower parts, and that the pressure cylinders are located approximately on the same vertical line as the outer margins of the vertical jib, or within them. The advantage is then gained that the turning means are protected against battering and the vertical jib itself presents no dangerous and detrimental projections which might hit against the cargo hatch margins or involve a risk of this to happen, whereby they would restrict the range of operation in the hold.

The unloader means of another advantageous embodiment of the invention is characterized in that the turning means are so disposed that it is possible to tilt the lower part in two directions with reference to the upper part. The advantage is then gained that it is possible to operate with this means both with a large reach and in holds having a small hatch aperture, because the detacher head can be turned partly in under the vertical jib.

The unloader means of still one advantageous embodiment of the invention is characterized in that at the turnable joint the compartmented belt has been supported on both sides with the aid of a deflection roller set. The advantage which is then gained is exactly that the tilting feature is ensured and that better protection of the belt is obtained, and that unloading during tilting is rendered possible.

The invention is described more closely in the following with the aid of an example and with reference to the attached drawing, wherein:

FIG. 1 displays the unloader means of the invention in elevational view, and

FIG. 2 shows a detail of the turnable joint and set of deflection rollers of the unloader means.

FIG. 3 shows the section carried along the line III—III in FIG. 2.

The bulk goods unloader means consists e.g. of a gantry part moving on the quay on rails, and to which the requisite elements have been affixed, such as an intermediate jib 11 and a positioning rod 12 serving the purpose of maintaining the support 9 of the vertical jib 1 at all times in a position such that the vertical jib maintains its direction, that is, it is always substantially vertical in its upper part 2. The supporting structure affixed to the gantry part furthermore comprises a pull jib 17, a counterweight and a belt conveyor, of which the initial end 16 is visible in FIG. 1. The task of this belt conveyor is to transport the unloaded material further to sites consistent with its later use. The vertical jib 1 is suspended from its support 9, carried by a turnable bearing 10, and it is rotatable about its axis of rotation through 360 degrees both clockwise and counterclockwise. The vertical jib 1 has been constructed to be tubular. The cross sectional shape may vary according to the use which it serves. The vertical jib has furthermore been subdivided into an upper part 2 and a lower part 3, these two being interconnected by means of a turnable joint 6. The lower part 3 may be tilted with reference to the upper part 2 by means of four hydraulic cylinders 8, which have been disposed between the upper and lower parts in substantially vertical position and pivoted in a way enabling them to adapt to the tilting. The points of attachment of the hydraulic cylinders 8 have been selected so that the cylinders are protected within the vertical tube 1. To be sure, minor flared portions 18 and 19 have been provided at the points of attachment for the hydraulic cylinders in order to achieve a sturdy fixing base and, at the same time, in order to avoid an excessively large cross section of the vertical jib 1 over the entire length of this jib. It is essential that the hydraulic cylinders 8 lie protected within the protective cover constituted by the flares 18, 19, since otherwise the risk would be present that they are battered against the sides of the ship's cargo hatch, or the like. The lower part 3 may be tilted forward about 20 degrees, in which case the compartmented belt elevator 5 is still enabled to transport goods past the tilting point. By such forward tilting a wide reach is enabled when unloading bulk goods. Moreover, the lower part 3 may be tilted backward about 9 degrees, whereby the scoop wheel operating as detacher head 4 is placed under the vertical beam 1 in a position such that the distance of its outermost point from the axis of rotation 14 is at its minimum. The detacher head 4 is then introducible through comparatively small hatches. Adjacent to the turning joint 6 there is furthermore a set of deflection rollers 7, by which the compartmented belt is supported at the tilting point. Any point on the vertical jib 1 is not proper as place for the turnable joint 6: the selection of its location is predominantly influenced by three circumstances. Firstly, the establishing of a slope in front of the scoop wheel 4. This implies that the turning point should be placed as far down as possible. Secondly, the position of the discharging ramps 13 of the scoop wheel should be approximately constant for the feeding from the scoop wheel onto the belt to be successfully accomplished. This implies, in its turn, that the turning point could be placed as high up as possible. And thirdly a large enough reach should be obtained so that this notwithstanding the tilting angle might not become excessively large with a view to the angulation of the compartmented belt. The location of the turning joint 6 is in the first place a compromise between these three conditions.

The procedure in unloading bulk goods and in transporting it onward is as follows. The vertical jib and the scoop wheel 4 attached to its lower part 3 are lowered into the ship's hold with the aid of the intermediate jib 11. The vertical jib 1, and thus also the scoop wheel 4, rotates about its vertical axis 14 and thus performs a kind of boring motion as it unloads bulk goods. The scoop wheel 4 rotates at the same time about its own horizontal axis. The lower part 3 may be tilted to increase the diameter of rotation and thereby to increase the reach. The bulk goods flows from the scoops of the scoop wheel 4 along the discharging ramps 13 onto the belt elevator 5, which is of the compartmented belt type. The belt elevator 5 transports the bulk goods upward within the vertical jib 1, and at the top the bulk goods is discharged onto a sloping discharging ramp 15, whence it travels onward to the belt conveyor 16 and thence to desired points outside the unloading means itself.

It is obvious to a person skilled in the art that the invention is not exclusively confined to the example related above and that on the contrary different embodiments of the invention may vary within the scope of the claims presented below. For instance, the detacher head need not be a scoop wheel: in its place any other means performing the same task is appropriate, for instance a short chain elevator.

We claim:

1. A continuously operated bulk goods unloader comprising a vertical, tubular jib having an outer circumference, a supporter for said jib for maintaining the jib's direction, said supporter being affixed to a supporting structure carrying the unloader, an endless compartmented belt adapted to operate within the tubular jib, a detacher head supported on said jib for discharging bulk goods onto said belt, said vertical jib being subdivided into a lower part having an upper end and upper part having a lower end interconnected by a pivot, said belt being enclosed within the periphery of said ends, and pressure cylinders for tilting the lower part of the jib about said pivot with reference to the upper part thereof, said pressure cylinders being disposed substantially parallel with the vertical jib between the upper and lower parts thereof when the upper and lower parts are vertical and being positioned within the outer periphery of the ends of both parts of the vertical jib adjacent to the pressure cylinders for protecting these cylinders from impact.

2. An unloader according to claim 1, wherein said upper and lower parts of the vertical jib have flared portions at said pivot such that they provide a protective cover for said pressure cylinders.

* * * * *